United States Patent [19]
Holoubek et al.

[11] 3,896,710
[45] July 29, 1975

[54] FOLDABLE TUBULAR PACKAGE APPARATUS

[75] Inventors: George Henry Holoubek; David Edward Ales; Harland Elmer Harms, all of Muscatine, Iowa

[73] Assignee: Dart Industries Inc., Los Angeles, Calif.

[22] Filed: June 10, 1974

[21] Appl. No.: 477,939

Related U.S. Application Data

[60] Division of Ser. No. 397,460, Sept. 14, 1973, Pat. No. 3,851,568, which is a continuation-in-part of Ser. No. 376,725, July 5, 1973, Pat. No. 3,823,850, which is a continuation of Ser. No. 214,654, Jan. 3, 1972, abandoned.

[52] U.S. Cl................ 93/36.8; 93/39.2; 93/44.1 R; 93/59 ES; 425/112
[51] Int. Cl.²......................... B29F 1/10; B31F 1/00
[58] Field of Search............. 93/36.8, 39.1 R, 39.2, 93/39.3, 44, 44.1 R, 59 ES; 425/111, 112, 125, 126; 156/446

[56] References Cited
UNITED STATES PATENTS
2,883,706  4/1959  Quinche et al. ................ 425/125
2,923,975  2/1960  Voumard et al. ............... 425/112 X
3,778,321  12/1973  Abbott ............................. 93/36.8 X

FOREIGN PATENTS OR APPLICATIONS
159,852  12/1940  Germany ............................. 93/36.8

*Primary Examiner*—Roy Lake
*Assistant Examiner*—James F. Coan
*Attorney, Agent, or Firm*—Kenneth J. Hovet; Leigh B. Taylor; Paul R. Wylie

[57] ABSTRACT

A laminated settable tubular package is disclosed having integral end and body portions of the same material. The tubular package is formed with a process and apparatus which permits head and shoulder portions to be formed as a continuation of the tubular body through folding and shaping operations. The package is substantially impermeable and has particular use for containing toothpaste, essential perfumes, oils, solvents, flavorings, and other substances in which permeation of the atmosphere and/or volatization losses are problems.

5 Claims, 28 Drawing Figures

PATENTED JUL 29 1975 3,896,710
SHEET 1
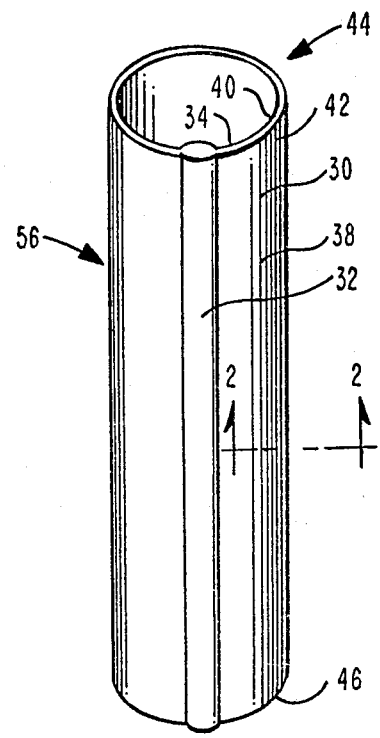
FIG.—1
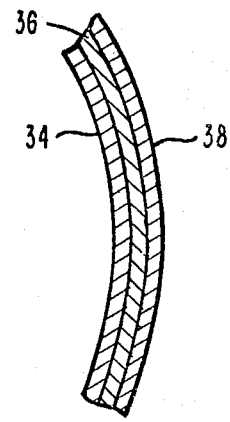
FIG.—2
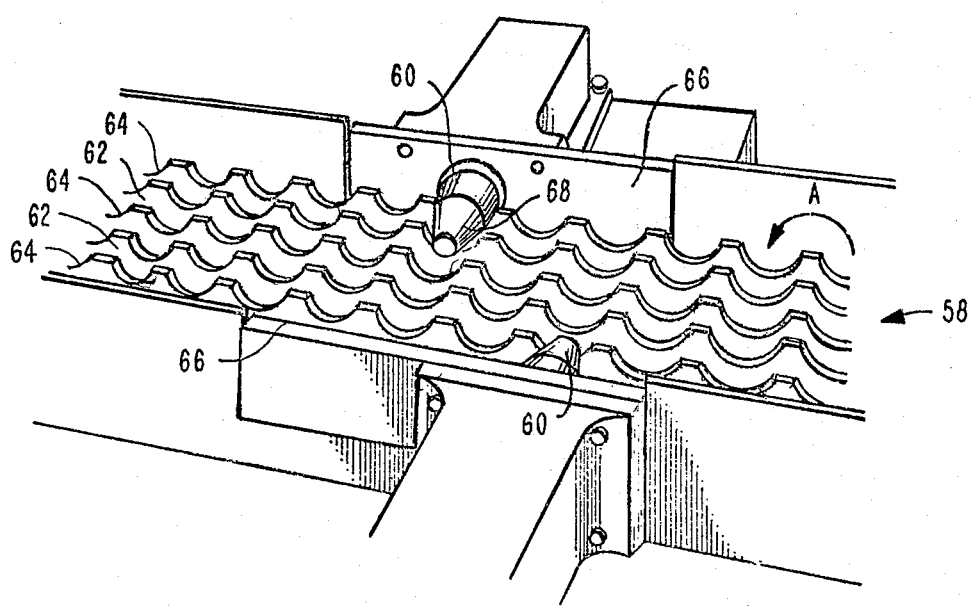
FIG.—4

PATENTED JUL 29 1975 3,896,710
SHEET 2
FIG.—3
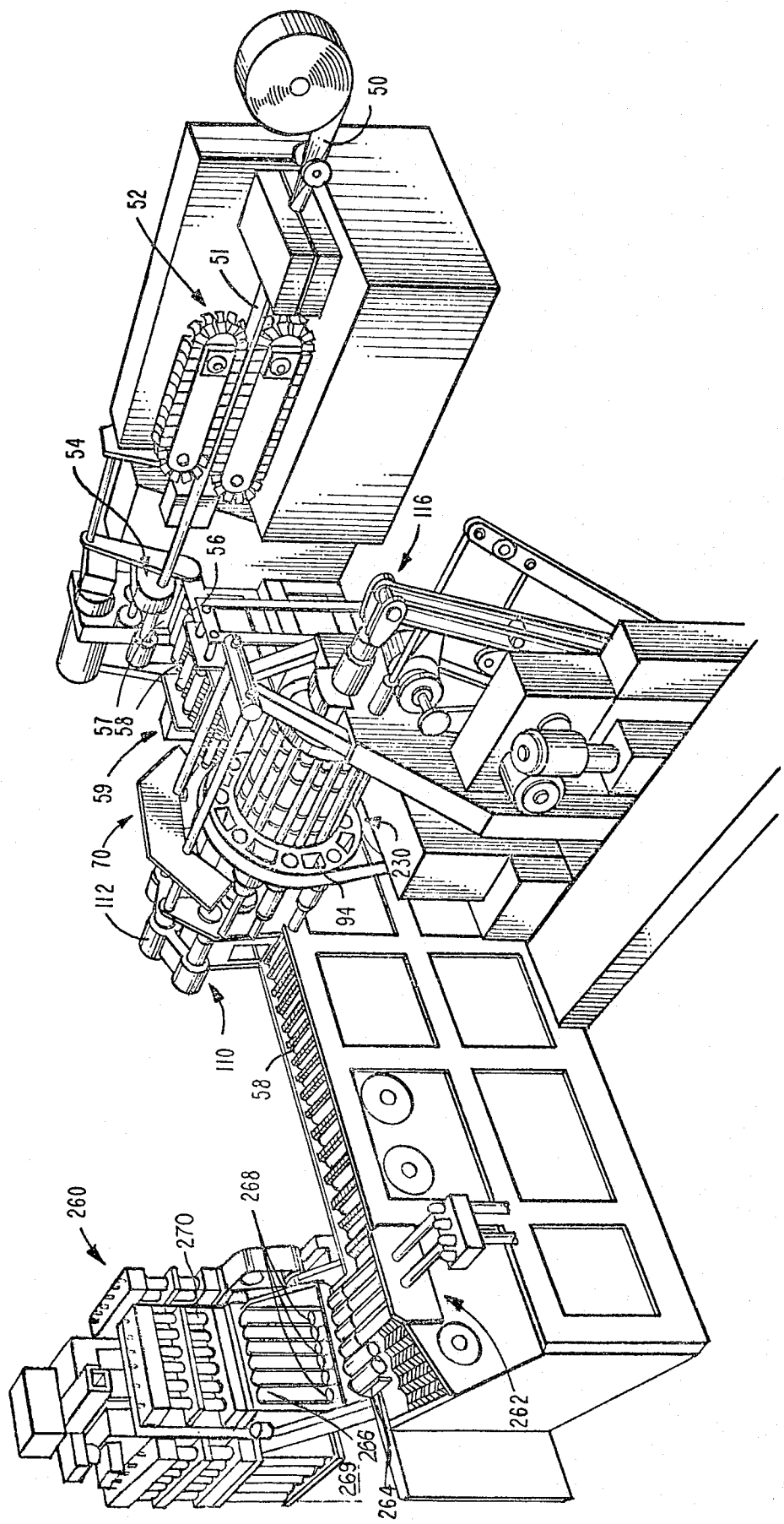

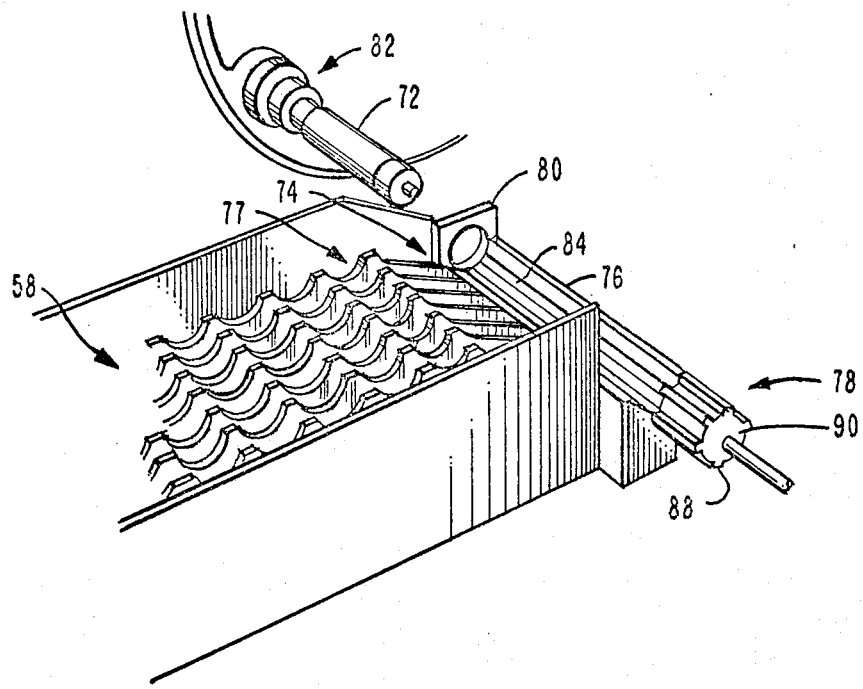
FIG.—5
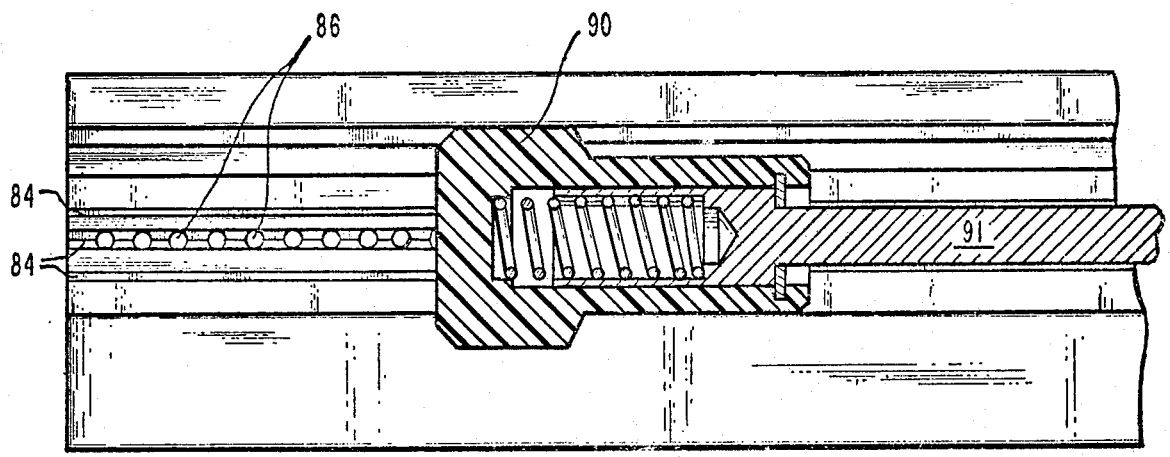
FIG.—5A

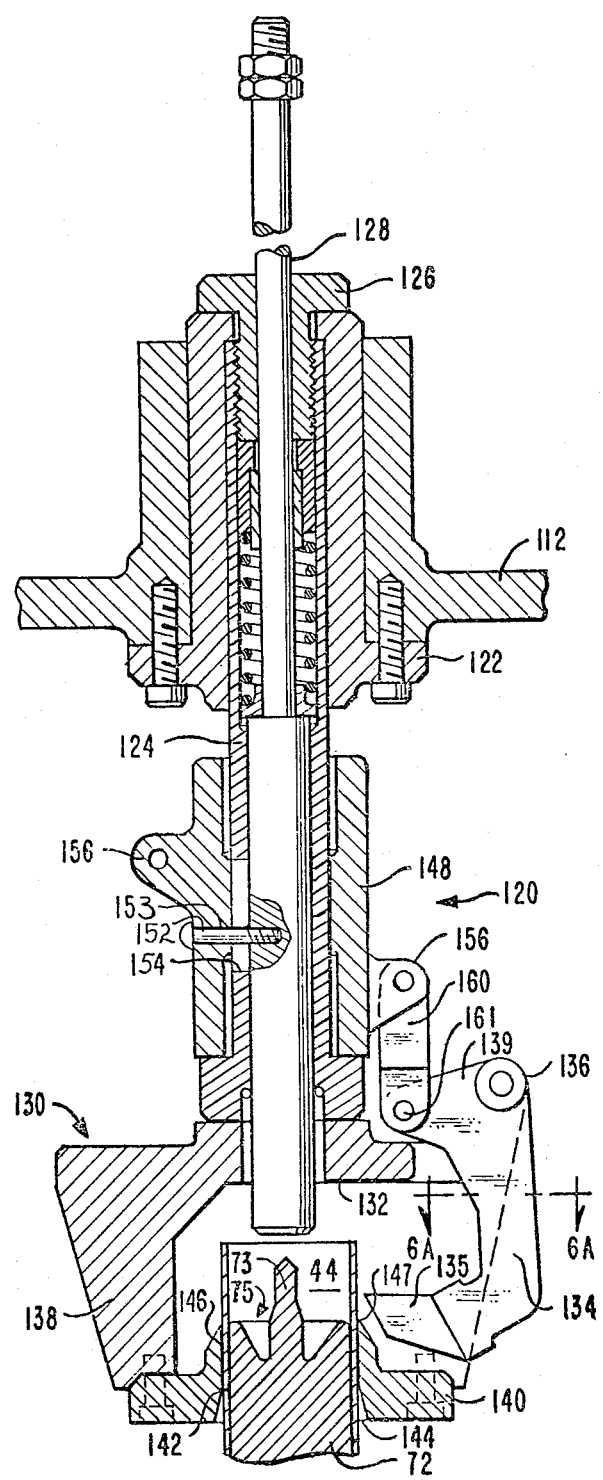
FIG.—6
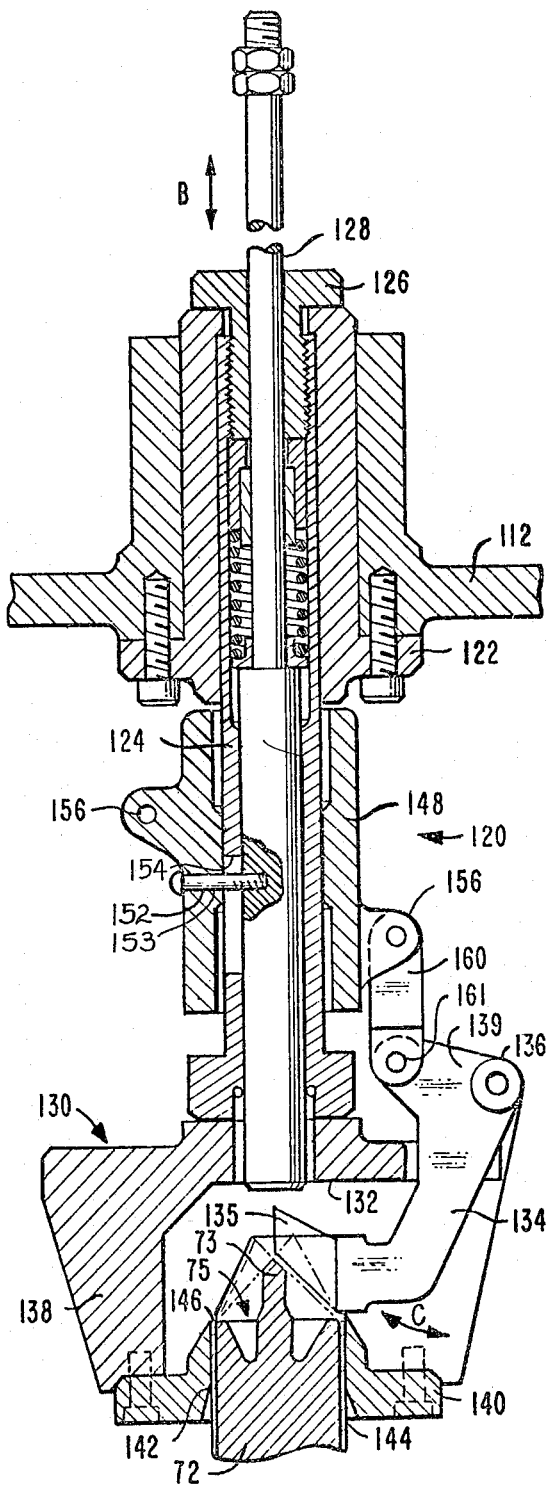
FIG.—7
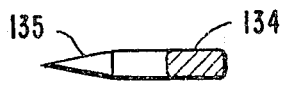
FIG.—6A

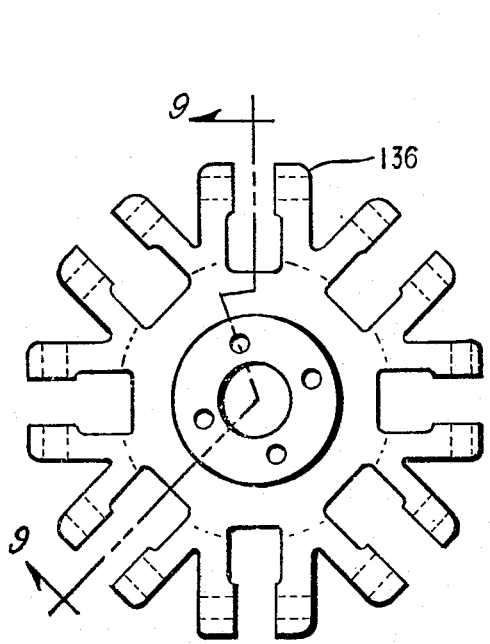
FIG.—8
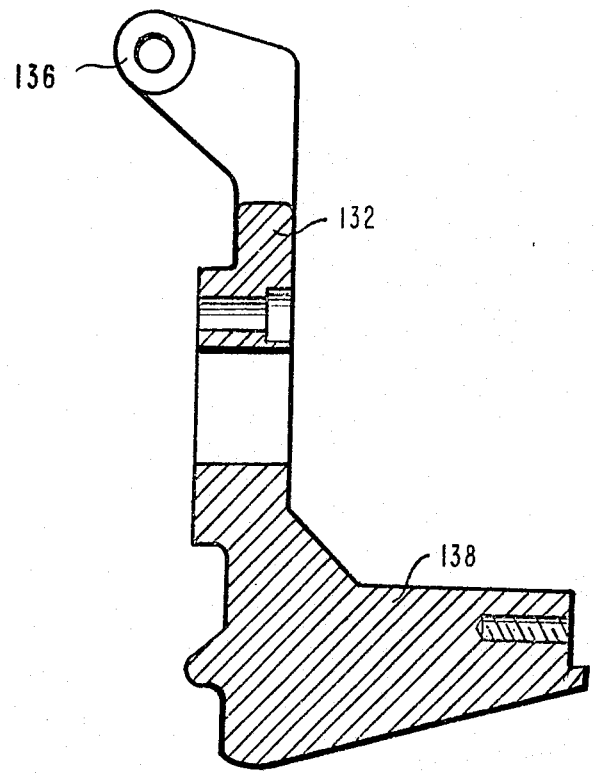
FIG.—9
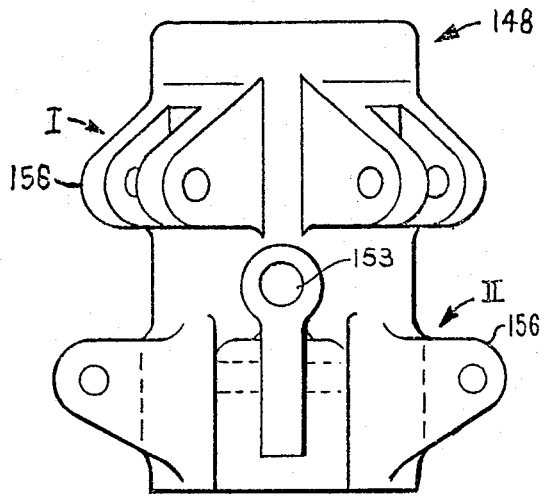
FIG.—10
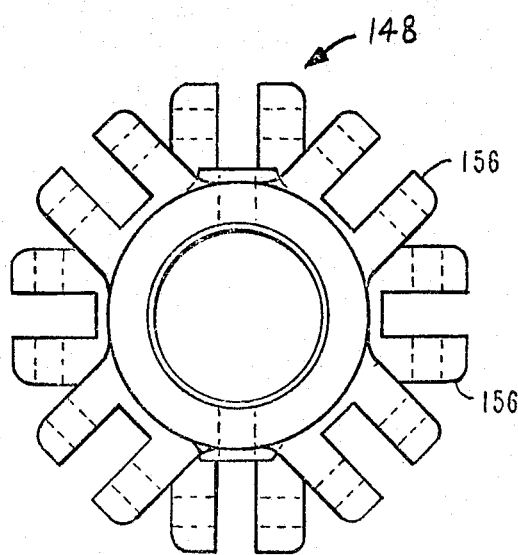
FIG.—11

PATENTED JUL 29 1975 3,896,710
SHEET 6
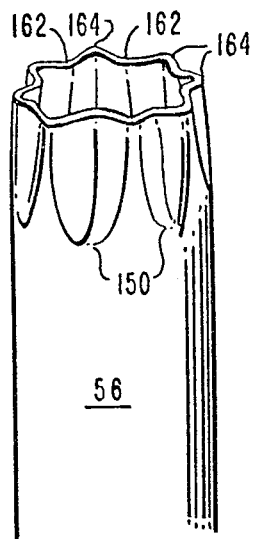
FIG.—12
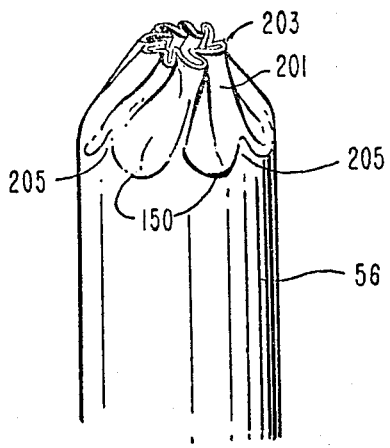
FIG.—14
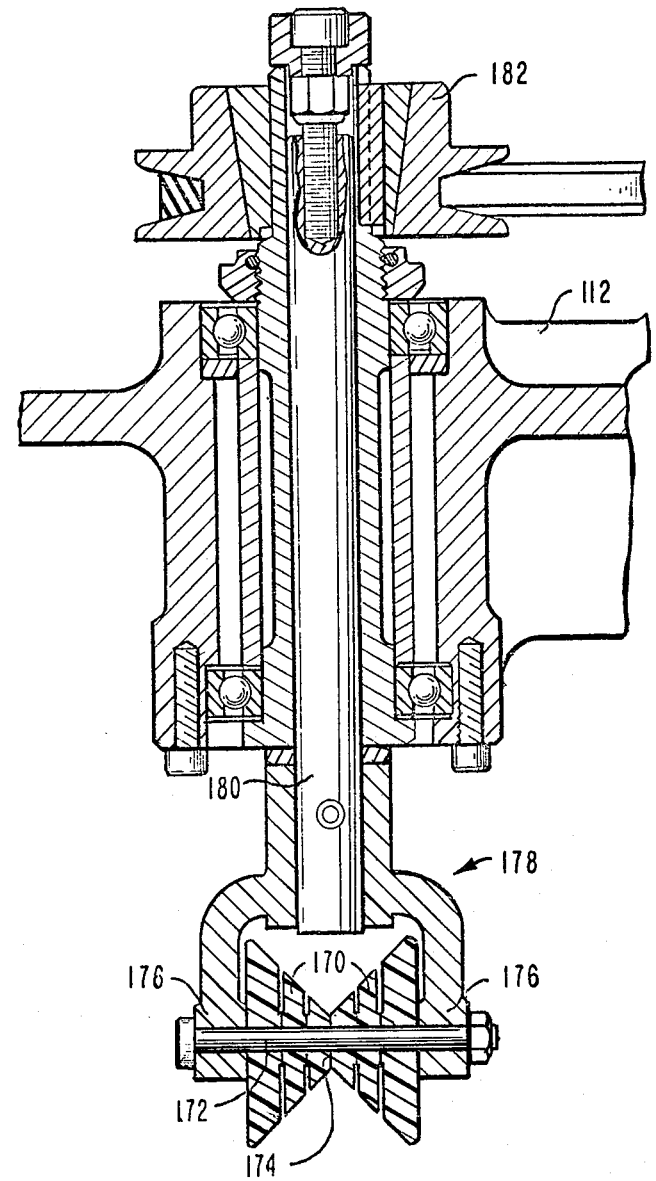
FIG.—13
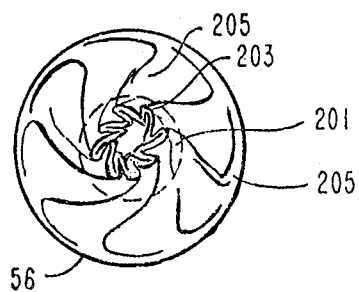
FIG.—16

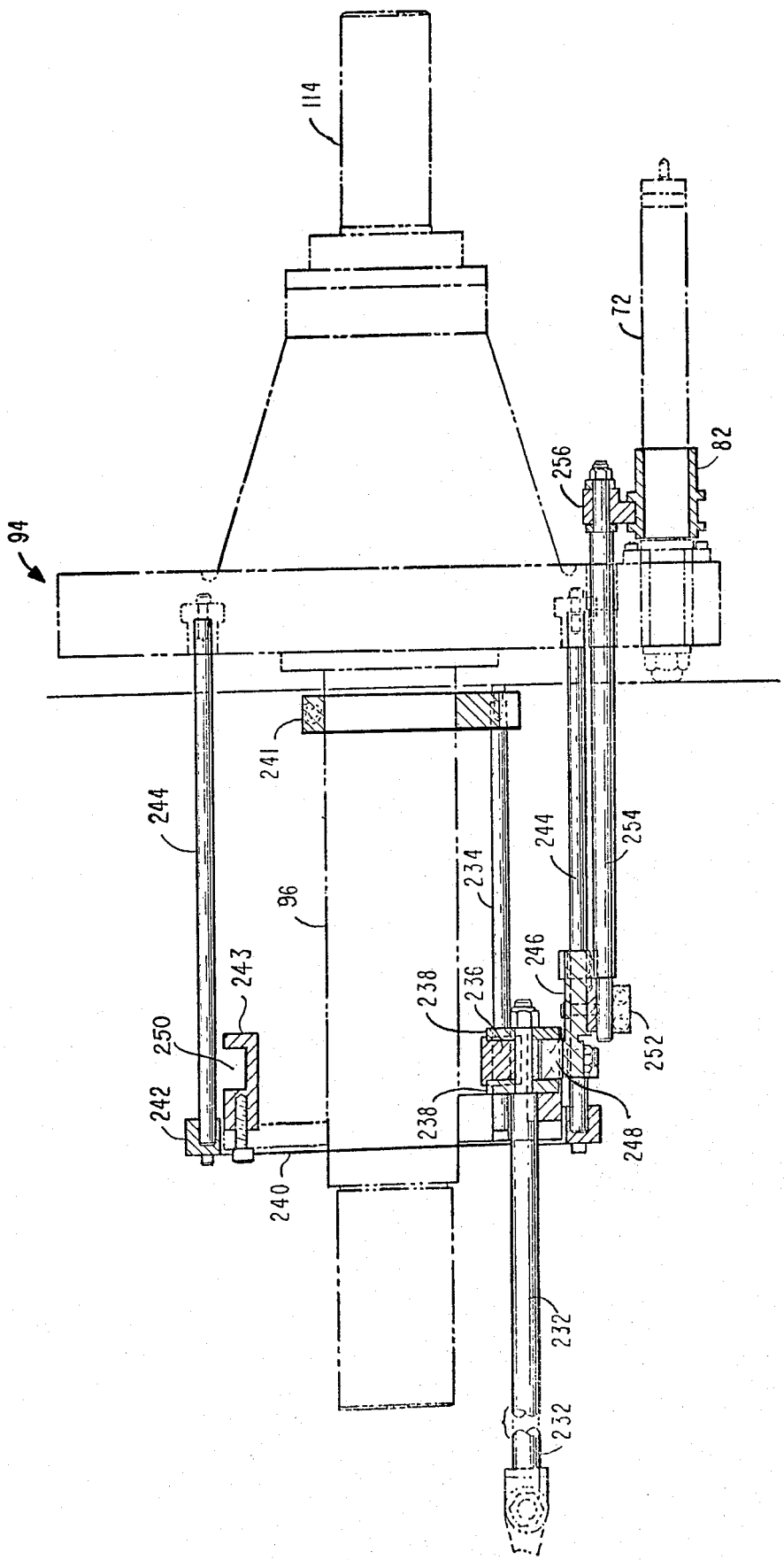
FIG.—19

FOLDABLE TUBULAR PACKAGE APPARATUS

This is a division of application Ser. No. 397,460, filed Sept. 14, 1973, now U.S. Pat. No. 3,851,568, which is a continuation-in-part of application Ser. No. 376,725 filed July 5, 1973, now U.S. Pat. No. 3,823,850 which is a continuation of application Ser. No. 214,654 filed Jan. 3, 1972, now abandoned.

BACKGROUND OF THE INVENTION

1. Field of the Invention

The present invention is related to tubular containers and, more particularly, to structural arrangement, method and apparatus utilized to produce laminated settable tubular packages which are substantially impermeable to volatile substances and atmospheric gases.

2. Description of the Prior Art

Various packages have been manufactured for use in containing a great many products such as toothpaste or the like which may be conveniently formed as tubular containers or packages. Various highly viscous products such as toothpaste may progressively be squeezed from such a package by foldably setting and rolling the package from the enclosed end toward the dispensing end. Conventional prior art packages utilized metal foil which, of necessity, was quite thick and expensive but had the desirable characteristic of being foldably settable. Such packages composed completely of metal foil were unsatisfactory in some situations where the settable material of the metal foil became brittle and cracked and caused leakage of contents from the package. Additionally, all-metal packages have been vulnerable to corrosion by their contents.

Various plastic packages have been used, but many of the all-plastic pakcages allow oxidation of products therein and allow volatile fluids of products to escape through the walls thereof and consequently an all-plastic package may not serve to contain some products over a considerable period of time. Furthermore, most plastic packages are not settable but remain resilient so that they cannot be conveniently folded and squeezed in such a manner as to progressively dispense material or products such as toothpaste or the like.

In accordance with prior art teachings, laminated tubular structures have been fabricated of sheets of material having a plurality of lamina wherein metal foil is bonded at its opposite sides to a polyolefin plastic material such as polyethylene or the like. These structures have a combination of desirable characteristics due to the fact that the intermediate metallic lamina serves as a barrier for volatile fluids and oxygen as well as to provide for a settable structure which may take a set when folded and hold the plastic lamina in folded condition such as is desirable in the progressive use of a toothpaste tube or the like which is typically progressively folded as the contents are dispensed therefrom. These structures also prevent corrosion of the metallic lamina since it is protected on both inner and outer sides by plastic material. Furthermore, the outermost polyolefin lamina is readily receptive to printing for the purpose of applying labels, trademarks, or other indicia on the outer sides of the hollow tubular wall structures.

Accordingly, the laminated tubular wall structures include many desirable characteristics and have therefore become quite versatile in the packaging of a great variety of products which may be oxidizable, corrosive to metal, or which may have volatile materials which tend to escape through plastics; and further, these laminated materials are readily mechanically settable and readily receptive to printing of indicia on the outer sides thereof.

Moreover, these laminated wall structures are relatively economical since a relatively small amount of metallic foil may be used with one or more thin econonical lamina of polyethylene or the like on inner and outer sides of the metal foil.

The laminated structures including two lamina of plastic and one lamina of metal foil can be produced in sheet stock. Due to the relative thicknesses of the lamina and the requirement for accuracy relative thereto, it has been found most economical to produce such materials in sheet stock and then to form the sheet stock into tubular wall structures by butting the edges, or forming an overlapping seam, and then heating with or without the addition of other thermoplastic material to provide a fused seam.

The prior art includes numerous patents disclosing laminated tubular wall structures with metal foil barrier lamina and wherein several separate barrier structures are required in the shoulder and neck area of the prior art packages, and the production of such packages utilizing several barrier parts has been relatively complicated and costly.

When several metallic lamina barrier parts are utilized in the shoulder and neck area of a toothpaste tube or the like, it is difficult to produce such structures accurately and to bond the various parts together in such a manner as to prevent oxidation of the product and to prevent the escape of volatile materials from products contained in the packages.

SUMMARY OF THE INVENTION

According to the present invention, there is provided a novel apparatus for producing a laminated and foldably settable tubular package having a tubular body. The package includes a laminated tubular wall structure with an integral shoulder and neck structure formed of folded portions which extend from the tubular body throughout the shoulder and neck area of the package to form a relatively thick shoulder and neck structure. At least three layers of the wall structure are disposed in the folded portions and in the shoulder and neck area of the package to thereby maintain continuity of laminated plastic and metal lamina throughout the body, shoulder, and neck areas of the package.

The invention involves the progressive formation of an annular row of crimped portions adjacent the open end of a laminated tubular body and subsequent positioning of the crimped portions into a row of acute triangular folded portions, all disposed in a substantially frusto-conical assembly of folds. In its preferred form, the triangular folded portions are formed into an annular row in which the folded portions are all positioned, and preferably twisted and rotated in the same general direction around the axis of the frusto-conical assembly. Subsequently, the frusto-conical assembly is inverted into a frusto-conical recessed shape with a central frusto-conical generally tubular portion integral therewith and in opposed disposition. This latter operation is done preferably by conforming dies in opposition to each other. The frusto-conical assembly serves to insure uniformity of the folds during the heading process and, in particular, the orientation and linearity of the inner fold lines.

The preferred system for applying a plastic covering to the tube head is that disclosed in U.S. Pat. No. 3,047,910 which is hereby incorporated by reference. In this system a hot disc of plastic is placed under pressure by means of dies at said frusto-conical recess portion and opposed frusto-conical tubular portion of said folded portions. The hot plastic under pressure is thermally and mechanically formed into an end portion which surrounds the shoulder and neck portion of the package of the invention and wherein an orifice and means for providing a closure are thermally and mechanically formed in surrounding relation with the neck portion of the package by compression molding. Alternatively, a plastic end piece can be applied by injection molding or other suitable processes.

The invention includes the use of unique dies and apparatus for the aforementioned crimping process as well as the twisting and folding process, and for forming the inverted or recessed frusto-conical and opposed concentric frusto-conical configurations preliminary to the forming and fusion of the end piece or member on the shoulder and neck structure formed by the folded portions which are integral with the tubular body structure of the package. The folded portions of the package of the invention at the shoulder and neck portions thereof, include at least three contiguous layers of the laminated wall structure so that the shoulder and neck portions of the package of the invention are quite strong and rigid and extend such that there is complete continuity of the plastic and metallic lamina throughout the body, shoulder, and neck areas of the package.

The uniform crimping and crimp twisting operations, in accordance with the invention, are particularly important when pre-forming the shoulder and neck portions relative to a laminated tubular wall structure which is initially formed of sheet stock and provided with a longitudinal seam. The preferred crimping and fold twisting operations, in accordance with the invention, insure uniform crimping and folding of laminated wall structures even though they have relatively thick, stiff seams, all of which allows all of the lamina, as well as the metallic barrier lamina, to extend uniformly and in continuity throughout the body, shoulder, and neck areas of the package of the invention.

OBJECTS

Accordingly, it is an object of the present invention to provide a novel laminated and foldably settable tubular package having a laminated wall structure including plastic and barrier lamina which extends throughout the body, shoulder, and neck area of the package and wherein folded portions are uniformly disposed in the shoulder and neck area of the package of the invention to provide for continuity throughout the body, shoulder, and neck area of the plastic lamina as well as the barrier lamina.

Another object of the invention is to provide a novel method and apparatus for forming a laminated and foldably settable tubular package which may be effectively used for containing and dispensing a great variety of viscous products such as toothpaste or other materials.

Another object of the invention is to provide a method and apparatus for forming a tubular package which is particularly adapted for accurately and uniformly crimping, folding, and forming a shoulder and neck structure integral with a tubular body having a plurality of lamina originally formed from sheet stock.

Another object of the invention is to provide a novel laminated and foldably settable tubular package having specifically novel folded structure in the shoulder and neck areas thereof, which promotes facility and economy of manufacture, reliability of manufacture and efficiency in the production and maintenance of a uniform and continuous metallic barrier lamina and plastic lamina throughout the body, shoulder, and neck areas of a package and throughout all areas therein where the product may be contained in contact with the package.

Further objects and advantages of the product apparatus are method disclosed herein may be obvious from the following specification, appended claims, and accompanying drawings.

BRIEF DESCRIPTION OF THE DRAWINGS

FIG. 1 is a perspective view of an exemplary tubular wall structure.

FIG. 2 is an enlarged fragmentary sectional view taken on line 2—2 of FIG. 1.

FIG. 3 is a perspective view of the overall apparatus for making the tubular package of the present invention.

FIG. 4 is a fragmentary perspective view of a tube end straightening assembly and a tubular blank walking beam conveyor.

FIG. 5 is a fragmentary perspective view of a tube blank mandrel loading device.

FIG. 5a is fragmentary sectional view of a tube positioning block and a pusher mechanism for transferring the tubular blanks upon shaping mandrels.

FIG. 6 is a fragmentary sectional view showing a crimping die in the open position with a mandrel loaded with a tubular blank in position for crimping.

FIG. 6a is a fragmentary sectional view of a crimping finger of the crimping die shown in FIGS. 6 and 7.

FIG. 7 is the die of FIG. 6 in the closed position performing a crimping operation on the end of the tubular blank.

FIG. 8 is a top plan view of the finger support frame of the crimping die shown in FIGS. 6 and 7.

FIG. 9 is a side elevation view of the finger support frame shown in FIG. 8.

FIG. 10 is a top plan view of the pivot support member of the crimping die shown in FIGS. 6 and 7.

FIG. 11 is a side elevation view of the pivot support member shown in FIG. 10.

FIG. 12 is a fragmentary perspective view of a crimped end of a hollow tubular wall structure after the operation shown in FIGS. 6 and 7.

FIG. 13 is a fragmentary section view of a rotating cone assembly for folding the crimped end of tubular blanks.

FIG. 14 is a perspective view of a tubular wall structure similar to that shown in FIG. 12 but following the crimp twisting operation thereon by means of the rotating cone assembly shown in FIG. 13.

FIG. 16 is an end view of the tubular wall structure as formed in the die and pressing assembly set forth in FIG. 15.

FIG. 19 is a fragmentary section view of the assembly shown in FIG. 18 taken along the line 19—19.

PREFERRED EMBODIMENTS OF THE INVENTION

Figure 15:
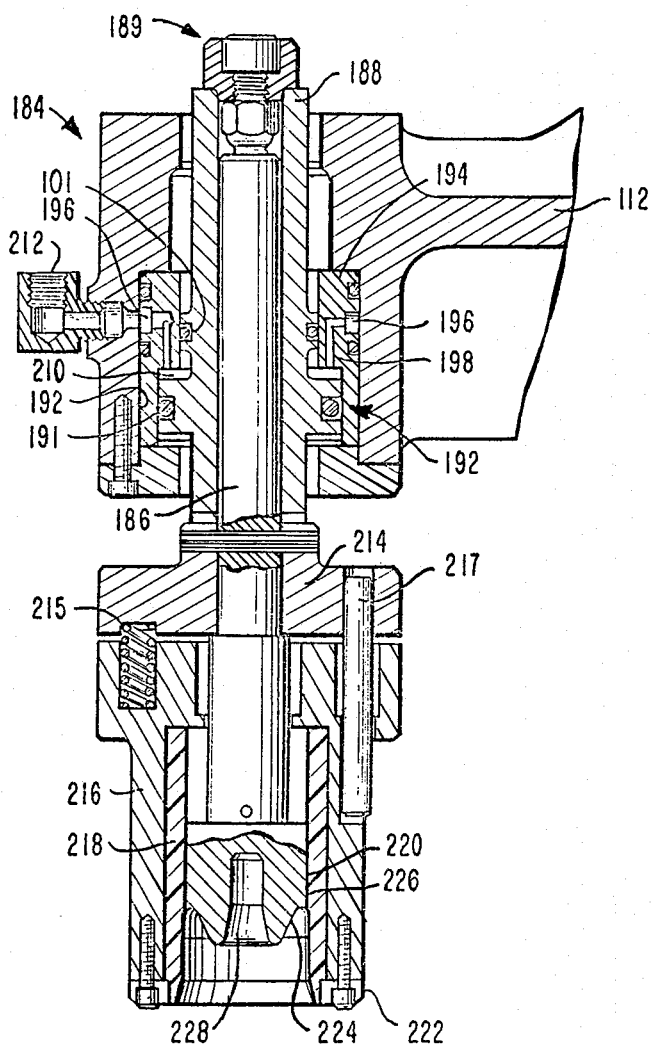
FIG. 15 is a fragmentary sectional view of a die and pressing assembly to convert the frusto-conical shaped folded end sections shown in FIG. 14 to the form shown in FIGS. 16 and 20.

As shown in FIG. 1 of the drawings, the invention comprises a hollow tubular wall structure 30. This hollow tubular wall structure 30 can be provided with a longitudinal seam 32 but also may be formed as a tube with a spiral seam. The seam can be fused lapped seam or one that has been folded and sealed or one utilizing a sealing strip or other adhesive material. The specific type of seam used will generally be dictated by the lamina compositions, their thickness, and the characteristics of the material to be contained within the tubular package. The same criteria is applicable in choosing a particular laminate for use in constructing the tubular package of the present invention. Any of the particular compositions known and used in the art and any number of layers and combination of metal foil, fiber, paper, and plastic material which are foldable, settable, and substantially impermeable to the products contained, are suitable for use as lamina in the present invention. Exemplary of suitable plastic materials are polyethylenes, polyvinylchlorides, polyvinylidene chlorides, polyvinyl acetates, polypropylenes, nylons, polyacrilonitrile, copolymers of the above, copolymers of ethylene and acrylic acid, and the like. The compositions, number of lamina, and their location with respect to each other in forming the laminate used in the tubular package are not deemed to be part of the novel aspects of the present invention. It is desirable, however, that an outer surface of the tubular body comprise a material that can bond together when the laminate is folded upon itself and formed into head and shoulder portions. It is also desirable that the outer surface be bondable to a plastic end piece which may be subsequently molded thereto. This is not critical, however, because a mechanical interlock can result when plastic material is forced upon the folded portion during formation of the end piece.

An example of a three-layered laminate is shown in FIG. 2 of the drawings wherein the wall structure of the tubular structure 30 comprises an inner lamina 34, an intermediate lamina 36, and an outer lamina 38. The intermediate lamina 36 can be a metal foil such as lead or aluminum, and the lamina 34 and 38 may be flexible plastic lamina such as a thermoplastic polyolefin, as for example, polyethylene, polypropylene, nylon, polyurethane, polyester, or the like, as described above.

The lamina 34 is disposed on the inner side of the tubular wall structure 30, while the lamina 38 is disposed on the outer side of the tubular wall structure 30, the inner side of the tubular wall structure 30 being designated 40 and the outer side being designated 42.

The lamina 34 at the inner side prevents corrosive material from attacking the metallic lamina 36 while the plastic lamina 38 on the outer side 42 is compatable with many materials used for printing of indicia on the outer sides of packages such as toothpaste tubes or the like.

The metallic lamina 36 is capable of acting as a barrier to the passage of fluids from a product at the inner side 40 and prevents the migration of oxygen from the atmosphere through the lamina 34 and 38 and into the product on the inner side 40.

The plastic lamina 34 and 38 are pliable but somewhat resilient, while the metallic lamina 36 is foldably settable and of sufficient thickness relative to the lamina 34 and 38 so that the tubular wall structure 30 may be folded flat and then rolled up in folded condition in a manner common to the well known metallic toothpaste tube, so that the package of the invention, as will be hereinafter described, may be used to dispense contents therefrom in a manner similar to the well known practice of metallic squeeze tubes of the type that are commonly used for toothpaste. It will be appreciated, however, that since the plastic lamina 34 38 are on both inner and outer sides of the metallic lamina 36, fracture of the metallic lamina 36 is not liable to occur and is of minor importance since in the event such fracture does occur it will most likely be in the area of tightly folded portions and will not permit leakage due to the existence of the plastic lamina 34 and 38 at opposite sides thereof. It will be understood that in certain instances where the foregoing considerations are not important, a laminate having only a single plastic layer bonded to the outer surface of a barrier layer can be used. Moreover, laminates having additional layers of metal, paper, and plastics can also be used.

An overall apparatus for producing the package of the present invention is shown in FIG. 3. A web of laminate material 50 is shown as being formed into a continuous tube 51 and fed through traction means 42 to a cutter assembly 54. The cutter assembly operates to cut-off predetermined lengths of the tube 51 into blanks 56 as shown in FIGS. 1 and 3.

The cut blanks drop into the concavity of a U-shaped block 57 which is orificed to allow a vacuum to be pulled in a manner to secure the blank from being dislodged. The block is pivoted to swing from the cutting location towards the tubular blank transportation means shown in FIG. 3 as walking beam 58. The block concavity tips toward the end groove of the walking beam as the vacuum is released so that the blank will roll onto the end grooves of the beam.

The walking beam includes a set of stationary grooved vertically extending plates 62 and a set of matching grooved plates 64 which rotate in a vertical plane parallel to the stationary plates. The axis of rotation is positioned such that the movable plates rise above the level of the stationary plates, swing forward a distance equal to the next line of grooves in the direction indicated by arrow A. In this manner, the blanks are intermittently and sequentially moved along successive grooves of the beam.

Other conveying means may be used such as belts, screws, bracket systems or the like. The walking beam conveyor, however, is especially adaptable to the continuous production of packages of the present invention because the intermittent dwell periods between rotational movements of the blanks allows time for coordinating and carrying out the various crimping, folding, shaping, blank loading and unloading operations to be hereinafter described.

Adjacent the walking beam is a plunger and wall assembly 59 for straightening the ends of blanks 56 that may have been dented during the previous tubing operations. This procedure is desirable so that the blanks may be subsequently loaded upon mandrels for the shaping operations.

FIG. 4 shows a perspective fragmentary view of the end straightening assembly with plungers 60 fully extended. The plunger head portions 68 have an outside diameter imately equal to the inside diameter of the tubular blanks and are actuated in timed sequence with the movement of blanks along the walking beam 58. They move outwardly into the ends of the blanks during the brief dwell period that the tubes are at rest during their intermittent movement along the walking beam.

To prevent the tube from being pushed off the beam by the plunger, a wall 66 is positioned directly opposite the direction of axial movement of the plunger. In this manner the tapered head 68 of the plunger 60 can push the tube against the wall and force open or deflect outwardly any creases, wrinkles, or dents existing about the tube end.

The plungers 60 are preferably offset from each other along the direction of blank movement to avoid disengagement problems and disruption of the production sequence. They may be mechanically or fluid operated by means commonly known in the art.

Referring again to FIG. 3, after passing the end-straightening assembly 59, the blanks 56 continue moving or walking beam conveyor 58 toward a first operating station 70. Operating station 70 generally includes a means for transferring blanks from the conveyor to mandrels located about a revolving carriage frame, a reciprocating forming assembly positioned opposite the carriage frame, and a means for stripping the shaped blanks from the mandrels.

Beginning with a description of the means for transferring the blanks to mandrels, reference is made to FIG. 5 which shows a perspective view of the preferred system for moving the blanks from conveyor 58 to shaping mandrel 72. As shown, the end of conveyor 74 is slanted downwardly with positioning means 76 shown in a U-shaped block located adjacent thereto. The longitudinal axis of the block is oriented parallel to the axis of the conveyor grooves so that as the blanks oscillate out of the last series of grooves 77, they will be unloaded at end 74 and roll by gravity into the concavity of block 76. Immediately thereafter, transfer means 78 operates to push the blank through guide orifice 80 onto mandrel 72 until it abuts stripper sleeve 82.

To help insure that the blank will become properly oriented when it rolls into the positioning means 76, the concave block 76 is longitudinally grooved as shown at 84 in FIGS. 5 and 5a and provided with vacuum orifices 86. The vacuum serves to secure the blank and facilitate orientation during movement.

The transfer means 78 includes a splined pusher head 90. The splines, shown as 88 in FIG. 5, are adapted to fit the grooves 84 so as to guide the movement of the pusher head and engage the end of the blank and effect the transfer thereof. Additionally, the head 90 is spring mounted on piston rod 91. It is desirable to have the head spring biased to compensate for any variations in blank length and to insure abutment of end 46 with stripper sleeve 82.

In the preferred embodiment, the blanks are loaded onto eight shaping mandrels referenced as numeral 72. The mandrels are positioned to project laterally from a carriage frame 94 and are spaced equidistant from each other and extended from the central axis of the carriage frame by equal radii. The mandrels have an inverted frusto-conical end structure with a central pin for purposes to be hereinafter described. Each mandrel is equipped with a stripper sleeve 82 which is located at a predetermined position on the length of the mandrel and serves to establish the distance the blank will extend beyond the end of the mandrel. This distance is important in obtaining the proper crimp and fold characteristics in subsequent shaping operations.

The carriage frame 94 is mounted for rotation on a tubular support shaft 96. The outer peripheral face of the frame is toothed to engage an indexing belt which, in turn, is driven by a commercially available indexing unit and drive means. Various combinations of indexing units and pulley sizes may be used to effect the desired rotation and dwell time depending on the type of tubular package being produced. In the preferred embodiment, a four stop indexing unit is used with an index period of 120° and a dwell period of 240°. Since the diameter ratio of the carriage frame to indexing unit pulley is 2:1, an 8-position indexing is obtained which corresponds to a stop and dwell period at the location of each mandrel on the carriage frame. See FIG. 18 for the relative locations of each mandrel about the carriage frame.

The dwell period for the rotation of the carriage frame is coordinated with the dwell period of the walking beam conveyor by a central drive means and timer. This is convenient since it allows the blanks 56 to be loaded and unloaded to and from the conveyor without interruption. Preferably the conveyor height is commensurate with the blank loading and stripping mandrel indexing positons to allow for gravity movement where possible.

Directly opposite the mandrels of the carriage frame is forming assembly 110. This comprises support means 112 upon which is mounted tube-end shaping assembly. The support means is fixedly attached to a second shaft 114 which is concentric with, and extends through, tubular shaft 96. One end of the shaft 114 is pivoted to a reciprocating means shwon in FIG. 3 as 116. Actuation of the reciprocating drive means is coordinated with the indexing dwell period, the tube end shaping assembly will be drawn toward the mandrels and mesh therewith. In this manner the shaping assembly will engage the end 44 of blanks 56 to perform the crimping, folding, and pressing operations to be hereinafter described.

Figure 18:
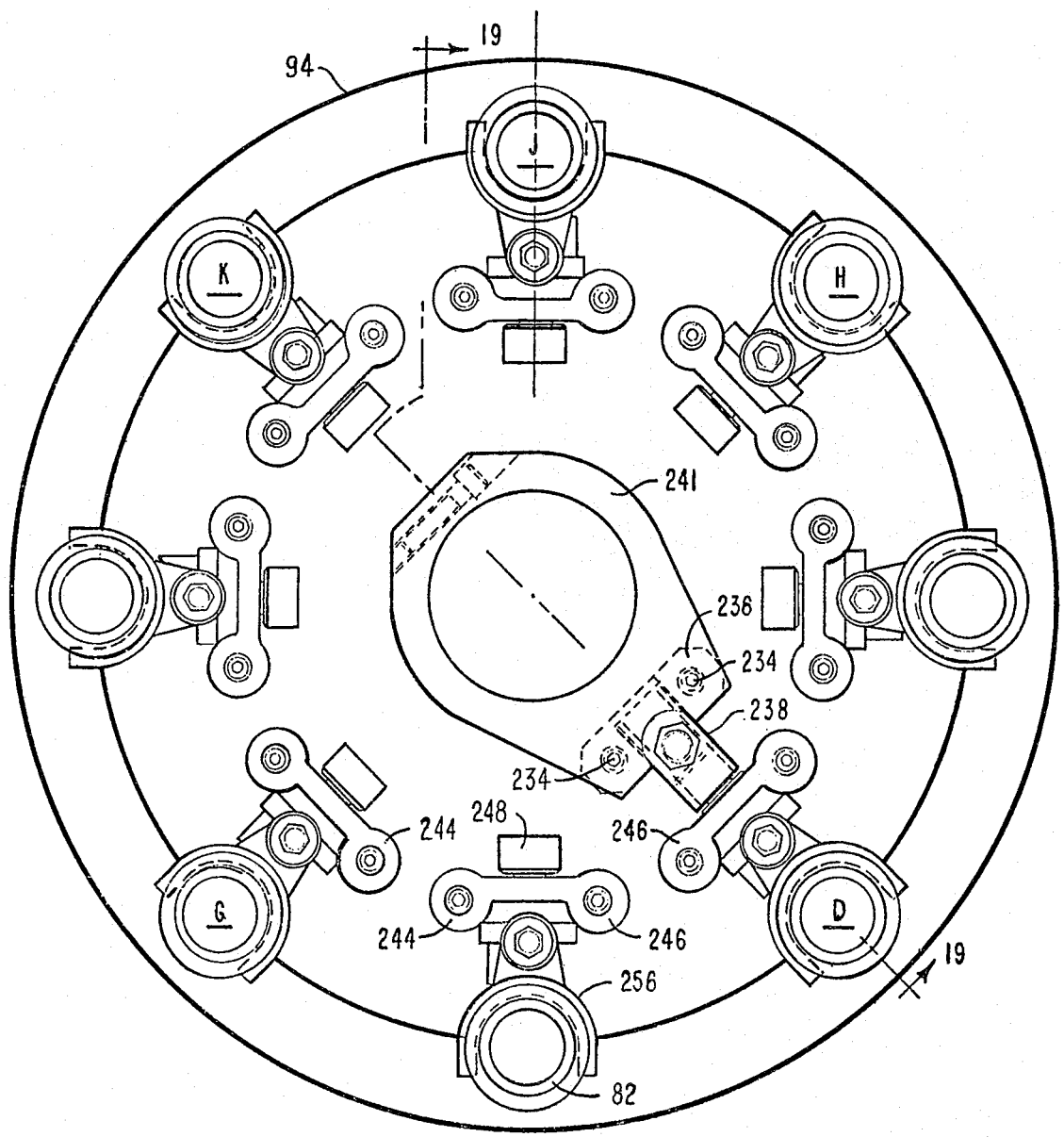
FIG. 18 is a front end view of an index head stripper assembly.

In the preferred embodiment, the shaping assembly involves three distinct mechanisms each operable at a specific mandrel position as indicated in FIG. 18. A first means at mandrel position K is used to crimp the end of the blanks, a second means at position J twists the crimps to fold them over, and a third means at position H involves die pressing the folded crimps to impart an inverted frusto-conical shape on the end of the tube. It has been advantageously found that by imparting the inverted annular crease across the folded crimps, linearity of inner fold lines extending parallel to the tubular axis throughout the head of the final package will be insured. This feature is highly desirable when the package is used to dispense viscous fluids such as glues, toothpastes, foodstuffs, grease and the like.

Referring now to FIG. 6 to describe the first means, there is shown the crimping means 120 of the present invention in its open position. Mandrel 72 is shown with the end 44 of blank 56 in position for crimping. The crimper 120 is secured to the support means 112 by hub 122. A support tube 124 is attached to the hub by retainer nut 126 whereby crimper shaft 128 will slidably extend through both the nut and support tube.

Fixedly mounted on the end of the tube 124 is finger support frame 130. As best seen in FIGS. 8 and 9, the frame has a central base portion 132 with eight pairs of radially extending pivot mounts 136 for attachment of finger elements 134. The mounts are spaced symmetrically about the central axis of the frame and project slightly above the central base portion 132. Alternating mounts each have a downwardly extending leg portion 138 which provide a base connection for mandrel guide ring 140.

Between each pair of mounts is a pivotally connected finger element 134. Each element may be a generally flat U-shaped structure with a tapered and pointed lower inwardly directed end portion 135 for effecting the proper crease or crimp on the end of the blanks.

The mandrel guide ring is disc shaped with a circular opening 142 therethrough. The opening is slightly enlarged at the entrance 144 to allow a smooth access with the mandrel and blank. To avoid the formation of unwanted wrinkles and to accurately locate the end or terminus 150 of the crimps, the guide ring includes a tapered annular extension 146. The guide ring has the effect of securing the upper portion 44 of the blank against movement when finger elements 134 are caused to swing inwardly slightly above the top edge 147 of said ring.

Concentric with support tube 124 is pivot support collar 148 (see also FIGS. 10 and 11). This collar is fixedly connected to shaft 128 by pin or bolt means 152 which extends through collar bore 153 and slot 154 of the support tube. The slot 154 is dimensioned to allow unobstructed axial movement of the bolt 152 as the collar reciprocates on the outer surface of the support tube 124 in correspondence with the shaft reciprocation within the tube.

As best seen in FIGS. 10 and 11, collar 148 includes eight pairs of link pivot mounts 156 spaced symmetrically about the circumference thereof. Each pair is in longitudinal alignment with a corresponding pivot mount 136 on frame 130. The mounts are positioned in two circumferential rows axially offset from each other and identified as I and II in FIG. 10. Each row has four mounts each with each mount being circumferentially offset from each other to allow room for the placement of connecting links 160. Eight connecting links 160 are pivotally connected at each mount 156 to each respectively aligned finger element 134 at a connection point 161 radially offset in the direction of rotation of said element. As such, the connecting links operate to transmit axial movement shown as direction B in FIG. 7, resulting from the reciprocation of shaft 128 through point 161 on the fingers 134. Since the fingers are pivoted at frame mounts 136, which are radially offset from link connection 161, the connection will convert the axial motion to rotational motion by lever-arm action of the upper leg 139 of finger 134. In operation, an upward movement of shaft 128 will move pivot support 148 by virtue of pin 152. As support 148 moves upwardly, link 160 will pull on finger 134 at connection 161 thereby causing rotation of finger 134 in the direction causing the finger elements to rotate shown as C in FIG. 7. This will cause finger end portion 135 to deflect tube end 44 and cause a series of eight symmetrically-spaced crimps about the tube as shown in FIG. 12.

The equal spacing of the finger elements 134 thereby provides for the evenly-spaced undulated crimped portions 162 at the open end 44 of blank 56. The crimped portions are provided with terminous portions 150 which terminate on the tube at a location substantially coextensive with the upper end of mandrel 72 and top edge 147 of guide ring 146.

The crimped portions 162 will be generally held in the frusto-conical form shown in FIG. 12 when one or more of the wall structure lamina is metallic or other settable material. In the preferred embodiment, lamina 36 is metallic with layers 34 and 38 being thermoplastic. To prevent possible rupture of the thermoplastic layers and to provide a sharper crimp set at 164, it has been found desirable to preheat the open end 44 prior to the crimping step. This may be conveniently accomplished with a hot air jet, radiant heating or the like.

Crimped portions 162 include radially extended singular portions 164 which are twisted into complete folded portions with the second means of the forming assembly. As shown in FIG. 13, the second means comprises a pair of opposing truncated cones 170 mounted to freely rotate on axle 172. The conical truncated portions 174 of each cone are positioned to abut each other to form a V-shaped surface for presentation to the crimped end of the blank 56 shown in FIG. 12.

Axle 172 is connected to the end of yoke 178 at opposing arms 176. The yoke is secured to spindle 180 which is journaled to the support means 112. The entire assembly is rotated by a pulley 182 and belt drive means well known in the art.

In operation, the yoke spins while the support means reciprocates causing the crimped blank, which has indexed from the crimping means to the twisting means, to press against singular portions 164. Because of the spinning of the yoke and free rotation of the opposing cones together with the reciprocation thereof, simultaneous axial and trangential forces operate to twist the portions 164 into the arcuate folds shown in FIG. 14.

When considering the structure of the hollow tubular wall structure 30, and particularly those having heavy seams such as seam 32, the operation of the dies and method disclosed in FIGS. 6, 7 and 13 is very important. Inasmuch as the seam 32 shown in FIG. 1 is relatively stiff compared to the remainder of the tubular wall structure 30, it is important that the crimping, performed as shown in FIGS. 6 and 7, and resulting structure as shown in FIG. 14, be precisely accomplished and uniformly finished to obtain a uniform result. Subsequently, it is important that all the crimped portions be uniformly engaged by the cones 170 or by equivalent means for uniformly twisting and folding the crimped portions 162 and 164 into the completely folded portions and particularly into an annular row in which the folded portions all extend uniformly in the same direction, and wherein these crimped portions become folded into acute triangular portions with their apices generally terminating at about the terminus 150 on the perimeter of the hollow tubular laminated wall structure. In furtherance of the above objectives, it is important that first contact and inwardly forward motion of the fingers 134 to the tube be at a location below the tube end 44, generally a distance equal to at least half the tube diameter. The tube resistance to bending at this point maintains the folds under tension and, as the fingers move toward the center, wrinkles are prevented thereby insuring uniform and repeatable folds.

As shown in FIG. 15, the crimped and folded end portion of the tubular wall structure disclosed in FIG. 14 is further formed by a third means of the forming assembly. The third means comprises a pressing assembly 184 having a central shaft 186 mounted within a piston 188. The shaft is secured to the piston by retainer means 189. The piston includes annular flanges 190 and 192 which are adapted to slidably engage the walls of cylinder 194. The rings 190 and 192 include annular sealing gaskets 192 for effecting a fluid tight seal between the piston and cylinder walls.

Cylinder 194 includes an annular recess 196 in communication with an external source of regulated fluid pressure. The recess 196 has connection ducts 198 which open into chamber 210 formed by the walls of the cylinder and piston flange 192. A fluid pressure medium such as air, nitrogen, water, hydraulic liquid or the like enters the chambers 210 by nipple 212, recess 196 and ducts 198 and exerts a force against the piston flanges 192. The mount of pressure may be regulated by diaphragm or control valve means well known in the art. The piston will move axially within the constraints or clearances allowed by chamber 210 whenever an opposite force overcomes the regulated fluid pressure. Typically 40–60 psig air pressure is used to offset the pressing pressure on the crimped and folded end section of blanks 56, however, this will vary depending on the materials comprising the wall structure 30.

The lower portion of shaft 186 includes a spring retainer die part 220 and guide member 214. Coupled to the lower portion by spring 215 and guide rod 217 is housing 216 which contains sleeve 218. The sleeve 218 is held in the housing 216 by retainer ring 222. The die part is provided with an annular frusto-conical recess 224 which is inverted and extends convergingly into the die portion from a peripheral end 226. The die portion 220 is provided with a central frusto-conical recess 228 which is concentric to the inverted frusto-conical portion 224 and is adapted to receive the pin 73 of the mandrel 72. It is to be noted that the configuration of die part 220 is complementary to the end 75 of mandrels 72 and operates as a male mold part in the pressing operation.

Figure 20:
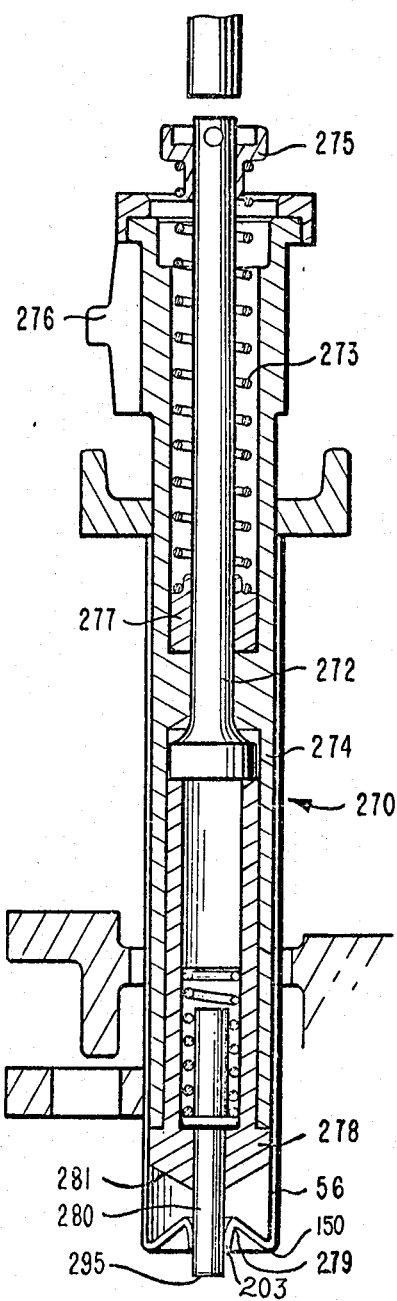
FIG. 20 is a fragmentary sectional view showing details of the heading mandrel with a shaped blank positioned thereon.

After the carriage means has indexed a blank containing mandrel from the folding means to the third pressing means, the support means will reciprocate inwardly, as previously described, and cause the end of the blank to be pressed and shaped to the configuration shown in FIGS. 16 and 20. As shown therein, the folded portions 201 are deformed into the general cross-sectional shape set forth in FIGS. 20 and 21. Ends 203 of the folded portions 201 extend a distance about equal to a common plane of the apices 150. During pressing, the die part 220 is allowed to deflect axially a small distance against the piston within the annular pressurized chamber 210. This is to compensate for laminate and machine irregularities and to insure that the proper shape will be imparted to the folded end without tears or ruptures in the laminate. The guide rod 217 and spring 215 allow a slight axial deflection of the housing and sleeve 218 so as to properly guide and align the blank and mandrel into the female die 220. It is to be understood that there are at least two efficacious purposes for forming the inverted annular frusto-conical shape to the folded tube end. One is to form an end surface capable of receiving a hot plastic disc during the subsequent preferred heading process. The second is to preset inner fold lines in the tube end along lines parallel to the longitudinal axis of the tube.

Figure 17:
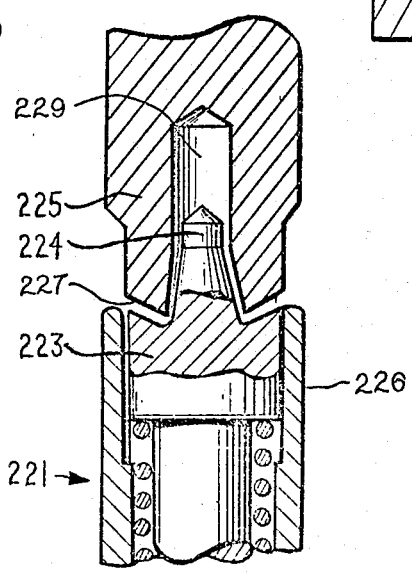
FIG. 17 is a fragmentary sectional view of an alternative pressing die for use in place of the assembly shown in FIG. 15.

An alternative embodiment to the pressing assembly 184 is that shown in FIG. 17. This system requires a modified mandrel 221 in place of mandrels 72. The mandrel 221 includes integral pin 224 and floating spring biased mandrel head 223 which provides the axial compensation and back pressure supplied by the previously desribed fluid pressure-piston system. The cross-sectional configuration of head 223 is the same as end 75 of mandrels 72.

In matching conformity with mandrel 221 is die member 225. This member is simply a shaft having an end 227 that has an inverted annular frusto-conical configuration with a central concentric frusto-conical recess 229 adapted to receive the pin 224 of mandrel 221.

The advantage of the alternative embodiment is that the head 223 will deflect into mandrel housing 226 when head 225 pushes thereagainst. This will operate to draw laminate structure 30 over the top edges of housing 226 and effect a smoother terminus portion 150.

After the end folds have been inverted by the pressing assembly, the carriage means indexes the blank to the unloading position shown at D in FIG. 18. At this point, the stripper sleeve 82 becomes activated and operates to slide the shaped blank off the mandrel 72 or alternative mandrel 221 onto the walking beam conveyor 58 for movement to the second operating station. As is the previous operation, tube stripping occurs during the indexing dwell periods by operation of an index head support shaft assembly shown essentially in FIGS. 18 and 19 and generally at reference numeral 230 in FIG. 3.

Cammed drive means operating in synchronization with the rotation of the carriage means, causes the reciprocation of drive rod 232, as best seen in FIG. 19. The drive rod is slidably connected to a pair of parallel extending drive support rods 234 by slide block 236.

Slide plates 238 are affixed to opposite sides of block 236 for a purpose to be hereinafter described. The drive support rods are mounted at one end by stationary base plate 240 and on the other end by housing clamp 241.

The stripper assembly includes a cam track ring 243 fixedly attached to the stationary base plate 240. About the circumference of the base plate rotates support ring 242. This ring is concentric with carriage frame 94 and is connected thereto by a series of eight pairs of stripper support rods 244 symmetrically spaced thereabout. Slidably mounted on each pair of stripper rods is a stripper rod guide 246. Fixedly secured to an upper surface of each guide is a cam follower 248. The cam followers are adapted to fit within the channel 250 of the cam track and slide therein as the carriage frame rotates. Secured beneath each rod guide 246 is a clamp 252 for fixedly holding stripper rod 254. Upon the end of each stripper rod is mounted a yoke 256 which, in turn, is attached to stripper sleeve 82.

The stationary cam track ring is provided with a slot at indexing position D as shown in FIG. 18. In FIG. 19 the assembly is shown at the beginning of the dwell period whereby drive rod 232 is in its retracted position with slide plates 238 being parallel to the sides of the cam track. In this positon, cam follower 248 will be between the side plates and the back side plate will operate to engage the cam follower when the drive rod 232 commences forward movement. Since the cam follower is affixed to the rod quide 246 which also fixedly holds stripper rod 254, the assembly will move in unison. The drive rod will be directed and held in alignment by stationary drive support rods 234 and similarly, the stripper rod will be guided and maintained in alignment by stripper support rods 244. The yoke 256 transmits the axial movement of rod 254 to the sleeve 82 which slides the blank completely off mandrel 72. The blank is allowed to fall a short distance by gravity into the grooves 77 of walking beam 58. Both the extension and retraction of the drive rod occurs during the dwell period so that the slide plates 238 can be in position to engage the next cam follower.

After being formed in accordance with the foregoing, a head piece is integrally applied to the blank by an apparatus and process somewhat similar to that described in U.S. Pat. No. 3,047,910 to Myron H. Downs which is herein incorporated by reference. Alternatively, the head pieces can be applied by in-situ injection molding, fusing of previously injection molded head pieces, or other compatible processes.

In the preferred embodiment shownin FIG. 3, the shaped blanks move on the walking beam conveyor to the second operating station shown generally by reference numeral 260. A predetermined number of blanks are pushed off the walking beam by off loading means 262 and accumulate onto a tilt-up plate 264. The plate 264 has a series of longitudinal grooves adapted to hold each of the blanks. The plate has an opposite matching grooved plate 266 mounted stationary on the base frame 269 of the second operating means. The plate 264, filled with blanks 56, tilts upwardly to close with the plate 266. Pushers 268 subsequently operate to transfer the blanks onto heading mandrels shown generally as 270 in FIG. 20. It has been found desirable to include vacuum orifices in the plate 264 to prevent the blanks from sliding out of position during the tilt-up operation.

Each heading mandrel includes a heading mandrel compression spring 273 extending between shaft cap 275 and shaft guide 277. Spring 273 operates to retract shaft 272 after which is slidably mounted in holder 274 upon completion of the molding cycle. Holder 274 is secured to fixture top plate 276 which operates to vertically raise and lower each set of mandrels. Head 278 fixedly connected to shaft 272 is an inverted frusto-conical shape and includes a central spring loaded insert 280. The insert is adapted to move into the generally frusto-conical tubular portion 279 of blank 56 and insure that the end orifice of the blanks formed during the first station shaping operation will remain open during the punching cycle to be hereinafter described.

Referring generally to FIG. 3, the second operating station includes a rotatable frame upon which is mounted four fixtures of six mandrels each. It is to be understood, however, that any number of mandrels may be mounted thereon. Each fixture is symmetrically located on straight lines forming a square about a central axis and each location corresponds to a step in the heading process. After the mandrel loading step described above has been accomplished, the rotatable frame rotates 90° to locate the mandrels in position for carrying out the punching cycle.

Figure 21:
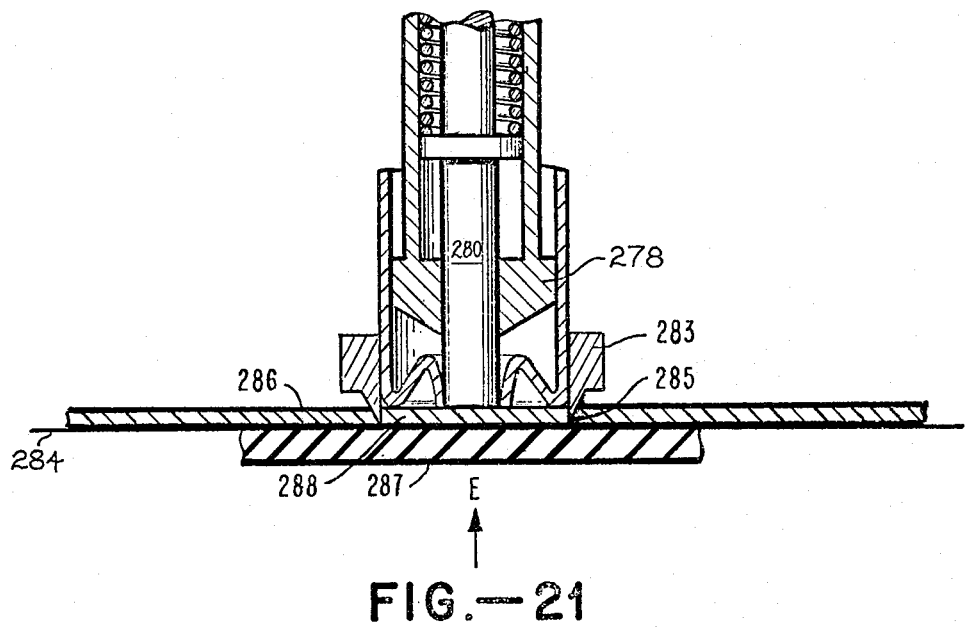
FIG. 21 is a fragmentary sectional view showing a blank loaded heading mandrel during a plastic disc punching cycle.

Referring now to FIG. 21, the fixture lowers so that the shaped end of the blanks are inside and approximately flush with the bottom annular cutting edge of punches 285. A resilient pad 287 is pushed up in the direction shown by arrow E in FIG. 21 to force the punch 283 through a web 286 of hot plastic material which is conveyed under the punch by belt 294. A circular disc 288 of hot plastic is left adhering by the heat thereof to the apices 205 terminus 150 and ends 203 of blank 56. The fixture is lifted and subsequently rotated 90° to the compression molding position.

Figure 22:
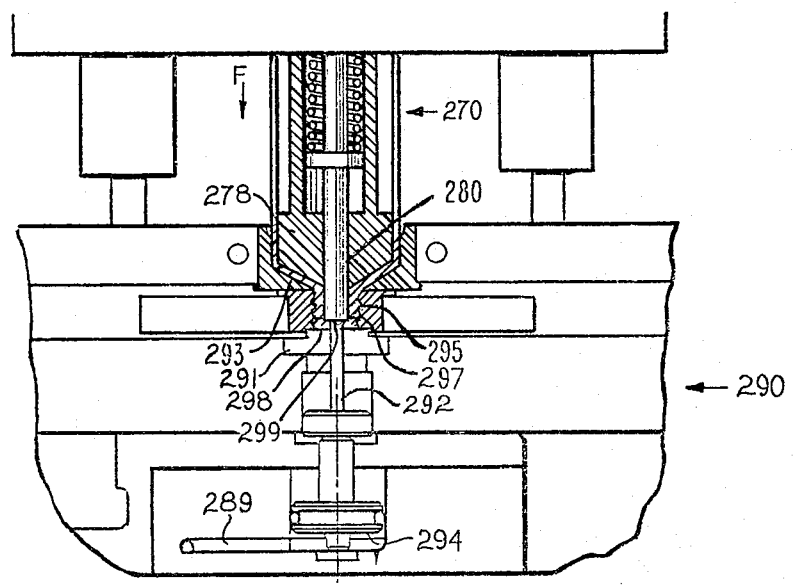
FIG. 22 is a fragmentary sectional view of compression molding dies used to form a plastic covered head on the tubular package of the invention.

As shown in FIG. 22 the mandrel 270 with head 278 is placed in a head forming die 290 and moved in the direction of arrow F. The spring loaded insert 280 moves against air biased pin 292 which slidably extends into the mold cavity 293. The pin is maintained in the cavity during the molding cycle by fluid pressure transmitted through ducts 289 against piston 294. The outer diameter of rim 292 forms orifice 324 in the head 310. Simultaneously, the hot plastic 288 is forced under pressure into the mold cavity 293 which generally conforms to the shape of the shoulder 281 of mandrel head 278. The cavity 293 is provided with thread forming portions 295 surrounding the neck area of the package of the invention. The neck is formed from the frusto-conical tubular section of the folded portions 201 whereby the spring loaded insert 280 causes the portions 201 to become a straight wall tubular neck portion 316 as shown in FIG. 24 of the drawings.

Figure 23:
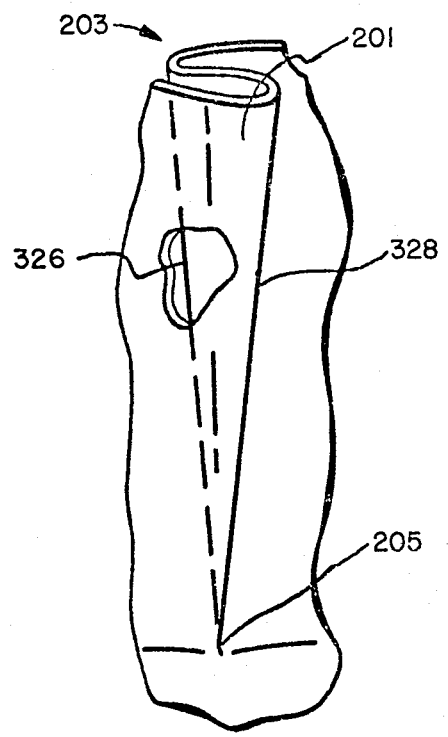
FIG. 23 is an enlarged fragmentary sectional view of an acute triangular folded portion of the preferred form of the invention which can form a structure extending throughout the shoulder and neck area of the package of the invention.
Figure 25:
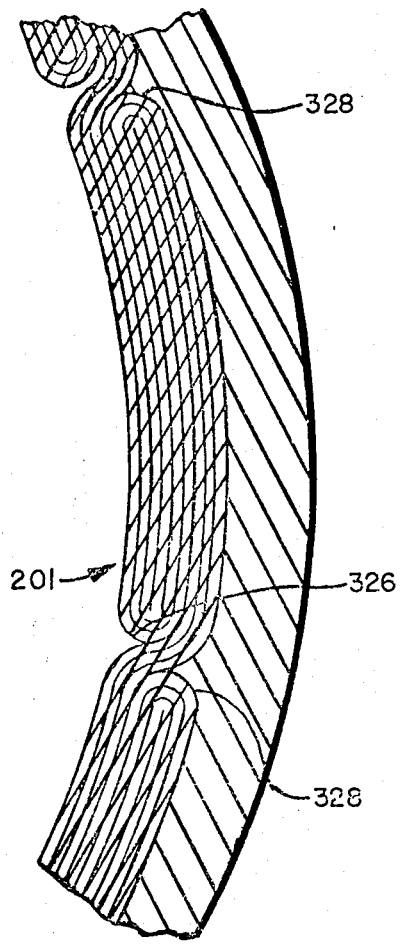
FIG. 25 is an enlarged vertical fragmentary sectional view of the plastic covered head of the present invention taken along line 16—16 of FIG. 24.
Figure 24:
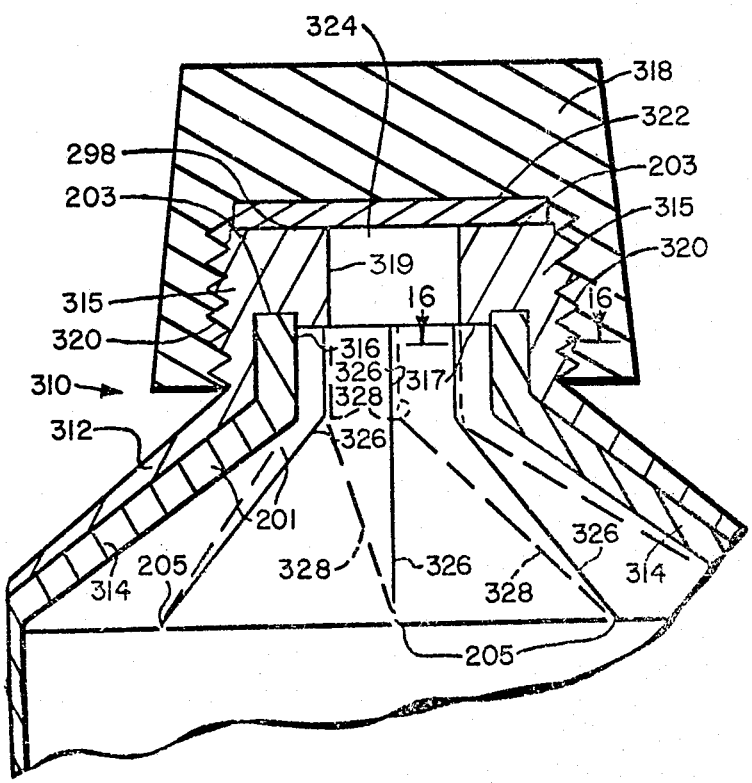
FIG. 24 is an enlarged fragmentary axial sectional view of the complete shoulder and neck portions of the invention with a closure cap thereon.

When the head 278 at its shoulder 281 forces the folded portions 201 to conform therewith, the triangularity of the folded portions are deformed therearound and become more nearly parallel in this area, and the folded portions 201 are then subtantially as shown in FIGS. 24 and 25. The folded portions 201 are shown on enlarged scale in FIG. 23.

It will be appreciated that when the hot plastic 288 is formed under pressure onto the outer side portions of the folded portions 201, the outermost plastic layer 38 becomes plastically bonded to the plastic 288 and that it is caused to flow into the general cross-sectional shape as indicated in FIG. 24, to form an end member having a shoulder covering portion 312 and a neck surrounding portion 315 comprising helical screw thread portions 320 formed by the screw thread forming portions 295 in the die 290. Other neck configurations may be formed, such as flanges, depending on the type of closure means being utilized.

The pin 292 includes a recess 299 to provide a cutting surface for disc 288 and projects into the mold cavity and abuts against end portion 297 of insert 280. The insert is of greater diameter than pin 292 so that when it abuts end portion 297, an annular offset portion 317 is formed in the orifice 324 of neck 315. The regulated air pressure (generally 30–80 psig) on the pin 292 serves to maintain its projection into the mold cavity and to displace insert 280 into a retracted position within head 278. The diameter of insert 280 forms inner surface 316 of neck 315 and pin 292 forms inner surfaces 319 of neck 315. The top surface of die part 291 serves to form end cover portion 298 which is disposed over the ends 203 of the folded portions 201.

Accordingly, it will be appreciated that all of the folded portions 201 can be finally pressed tightly together and due to the heat of the plastic 288 and/or the pressure of the compression molding force, the folded portions 201 are contiguously folded together so that the end section 310 of blank 56 is efficiently bonded at its shoulder portion 312 with a shoulder area 314 of the folded portions 201— this shoulder area being integral with the hollow tubular wall structure 30 and also integral with the inner cylindrical neck portion 316 hereinbefore described. Heat from external sources can be applied to effect such bonding, if desired. It is further contemplated that plastic material flows about the edges of the folds thereby forming mechanical bonding with the folded portions.

Subsequent to the compression molding step, the frame rotates the fixture 90° to the unloading position. At this point a clamping means raises to encompass the threaded neck portion within an opened clamping mechanism (not shown). The mechanism forms grooved orifices sized to engage the threads of the neck when closed to thereafter pull the tubes from the mandrels and deposit them in packing means or on a conveyor for subsequent capping.

As shown in FIG. 23, each triangularly folded portion at its apex 205 generally coincides with the perimeter of the hollow tubular wall structure 30. Opposite U-shaped folded edge portions 326 and 328 are disposed at acute angles to each other extending from apices 205 in a diverging relation to the divergent ends 203 of the folded portions 201.

A closure cap 318 is engaged with the screw threads 320 as shown in FIG. 24, and the gasket 322 is held in the cap 318 over the dispensing opening 324 to prevent the escape of materials from the interior of the package of the invention. The use of a cap liner, however, is optional and frequently plastic caps do not require such.

With reference to FIG. 25, the U-shaped folded diverging edge portions 326 and 328 can be seen and it will be apparent that each U-shaped folded edge portion 326 is in close proximity to an adjacent folded edge portion 328, the edge portion 328 being on the outer sides of the neck structure while the edge portions 326 are on the inner side of the structure, as shown best in FIGS. 23-25 of the drawings. It is to be noted that depending on the diameter of orifice 324 and head 315 plus the type and thickness of laminate structure, the edge portions may overlap each other to provide additional strength to the end section 310.

The folded portions 201, being of at least three layers of the laminated wall structure, reinforce the shoulder portion 314 and the inner neck portion 316, as shown in FIG. 24, and provide a mechanical arrangement by means of which all of the lamina 34, 36, and 38 extend in complete uninterrupted continuity throughout the tubular wall structure 30, the shoulder structure 314 and the hollow inner neck structure 316. The manner in which these folded portions 201 are disposed permits them to be formed without rupture and to be formed even though the seam 32 is relatively thick in one peripheral area of the hollow tubular wall structure 30. Additionally, it will be observed from FIG. 25 that each layer of each folded portion 201 contains three lamina, namely, the lamina 34, 36, and 38. It will be noted from FIG. 25 that the lamina 38 is folded against itself and is disposed generally at the outer side of the neck structure while the lamina 34 is disposed generally at the inner side of the neck structure and is also folded against itself so that the folded portions 201 are at least nine laminations thick and are very rigid, and since all of the plastic lamina fold against each other, pressure and heat provides for good bonding of these folded portions together when the hot plastic disc 288 is bonded to the folded portions 201 in a manner as shown in FIG. 22 of the drawings, and as hereinbefore described.

Figure 26:
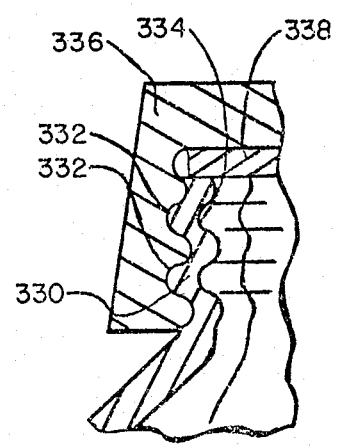
FIG. 26 is an enlarged fragmentary sectional view similar to FIG. 24 but showing a modification of the invention.

In the modification as shown in FIG. 26, the hot plastic disc 288 is not formed onto the neck and shoulder structure of the invention, but rather the folded portions 201 only are used to form a modified neck structure 330. This neck structure is provided with helically rolled screw threads having helical outward protrusions 332 and correspondingly intermediate recess portions 334 on the inside of the neck structure 330.

It will be appreciated that when the folded portions 201 are formed into helical screw threads 332, the laminations in the folded portions, as shown in FIG. 24, are formed into a very rigid neck structure capable of holding a cap 336 and a gasket 338 therein, to enclose contents within the interior of the package of the invention. To form such a product, it can be advantageous to use relatively thicker layers of metal and/or plastic and to apply heat at various stages of the process to provide, for example, thermally set crimps or folds.

The lamina 34, 36 and 38 are thin structural layers of plastic and aluminum or lead foil, and as a specific example, the lamina 34 and 38 may be 0.005 to 0.006 inches thick, while the lamina 36 may be 0.001 inches thick and may be made of metal foil such as aluminum or lead. The lamina 34 and 38 may be made of a polyolefin material such as polyethylene or the like; however, the foregoing materials and dimensions may be varied according to the size and other characteristics of the package to be produced.

It will be obvious to those skilled in the art that the three-to-one ratio of the folded portions relative to the laminated sidewall portions of the package provides for a fairly substantial ratio of thickness and/or strength between the sidewall portion and the shoulder 314 and neck 316. Accordingly, it will be appreciated that the thickness of the lamina 36, as well as the relative thicknesses in the lamina 34 and 38 may be varied, as desired, to adjust the mechanical characteristics of the tubular structure; as for example, when the metallic lamina 36 is relatively thicker, its influence over the relatively resilient plastic lamina 34 and 38 becomes apparent relative to the intermittently progressive setting of folds at the end of a package such as toothpaste tube or the like constructed in accordance with the present invention.

It will be seen that the folded portions 201 in areas of the tubular wall structure 30, as well as the shoulder area 314, and the neck area 316, maintains complete continuity of all of the lamina 34, 36 and 38, to provide for the prevention of escape of volatiles from the interior of the container outward, or to prevent the migration of oxygen from the atmosphere to products inside the package, and furthermore the outer lamina 34 is very receptive to various materials used for printing labels or other indicia on the outer sides of packages such as toothpaste tubes or other similar packages. While a tubular container has been discussed, containers of other geometric configurations can be used wherever the processing techniques and apparatus of the invention will be advantageous.

It will be obvious to those skilled in the art that various modifications may be resorted to without departing from the spirit of the invention.

We claim:

1. An apparatus for producing a collapsible container from tubular blanks comprising:
    transportation means for sequentially moving said blanks to a series of operating stations;
    a first operating station located along said transportation means for crimping and folding an end of said tubular blanks including a revolving carriage frame having a plurality of mandrels projecting therefrom and including indexing means connected thereto and drive means operating in conjunction with said indexing means to intermittently rotate said frame to predetermined positions whereby individual mandrels will become located directly opposite each of said shaping assembly means;
    a reciprocating support means adjacent said frame, said support means having mounted thereon a tube end shaping assembly comprising a crimping means, a twisting means, and a frusto-conical pressing means each located directly opposite to and concentric with a separate mandrel so that when said support means moves toward said carriage frame, each of the assembly shaping means will engage a blank on said mandrel opposite thereto;
    a second station downstream from said first station in the direction of travel of said blanks for shaping the folded end of said tubular blanks into a shoulder and neck portion.

2. The apparatus of claim 1 wherein said second station includes means for covering said shoulder and neck portion with plastic, said means including mold parts for shaping the folded end of said tubular blanks and covering said end with plastic.

3. The apparatus of claim 2 wherein said mold parts include a mandrel having a spring biased frusto-conical shaped head with a spring mounted central insert, a female mold part including a central pin biased against regulated fluid pressure and located to abut said central insert during molding, said mold parts cooperating to form the tube head section molding cavity.

4. The apparatus of claim 1 wherein said transportation means includes tubular blank end straightening means comprising a plunger adapted to engage the end of said tubes in synchronization with the movement of said blanks and a backing means positioned opposite from said plunger to restrain said blank from axial movement when engaged by said plunger.

5. The apparatus of claim 1 wherein said first operating station includes a system for stripping crimped and folded tubes from said mandrels comprising:
    a stationary cam track axially offset from said carriage frame and having a transversely extending slot thereacross;
    a reciprocating drive rod extending in alignment with said slot from eccentric operated drive means, said drive means actuated in synchronization with the rotation of said carriage frame, said drive rod having spaced apart plates at an end thereof with said plates positioned parallel to the sides of said cam track;
    a stripper rod slidably mounted on said carriage frame and located substantially parallel and adjacent to each mandrel for intermittent movement transversely of said frame, each stripper rod located in juxtaposition with said drive rod with each stripper rod having a cam follower secured to an end thereof, said follower adapted to move in said cam track as said carriage frame rotates and sized to fit between said spaced apart plates at said cam track slot for transmitting movement from said drive rod to said stripper rod, each of said stripper rods being connected to stripper sleeves slidably mounted on each of said mandrels, said sleeves adapted to abut the ends of shaped tubes located thereon for sliding said tubes off said mandrels when said drive reciprocates.

* * * * *

UNITED STATES PATENT OFFICE
CERTIFICATE OF CORRECTION

Patent No. 3,896,710      Dated July 29, 1975

Inventor(s) George H. Holoubek et al.

It is certified that error appears in the above-identified patent and that said Letters Patent are hereby corrected as shown below:

Item (75) after "Harms", insert -- Maurice A. Ditmars,

J. Keith Brookhart and Warren E. Erickson---.

Signed and Sealed this second Day of March 1976

[SEAL]

Attest:

RUTH C. MASON
*Attesting Officer*

C. MARSHALL DANN
*Commissioner of Patents and Trademarks*